Oct. 4, 1955  O. G. LILJA  2,719,508
HOLDER FOR CONE-SHAPED CONFECTIONS
Filed March 14, 1950
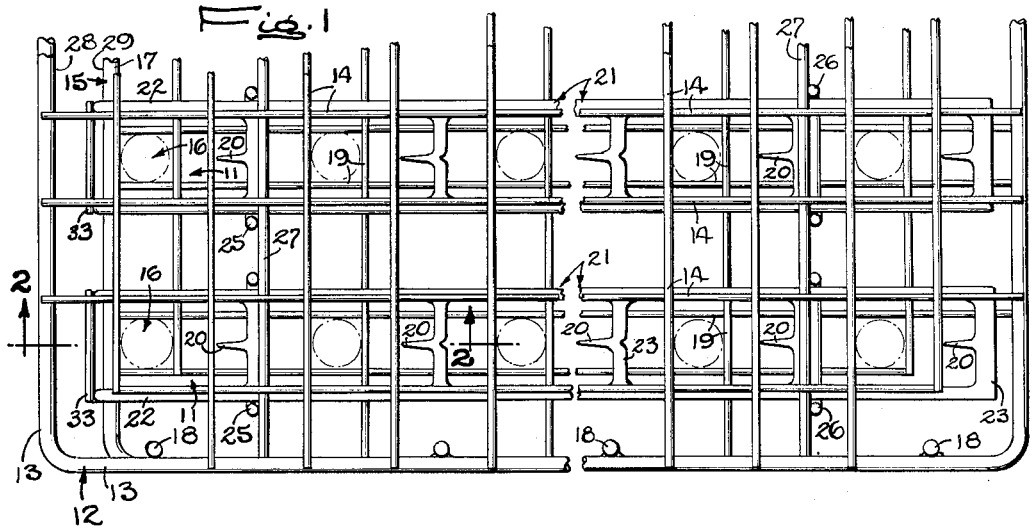
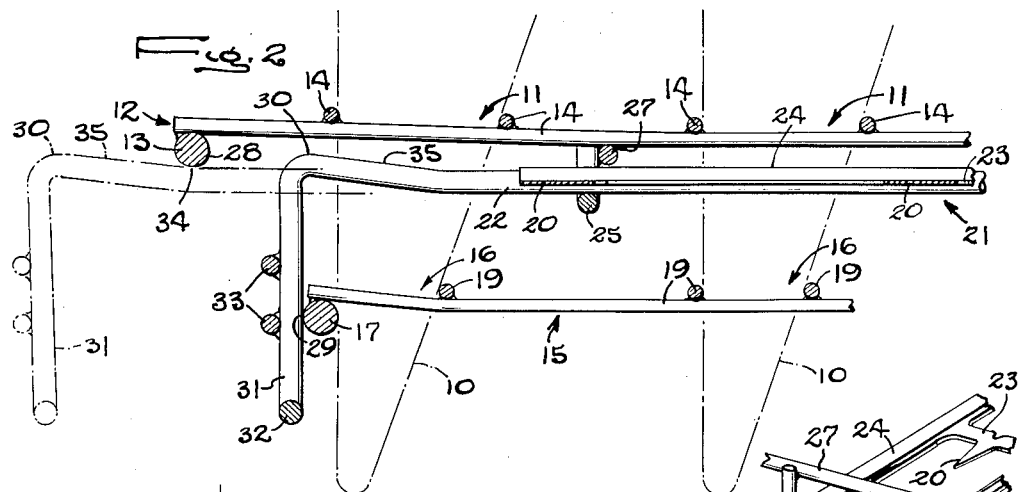
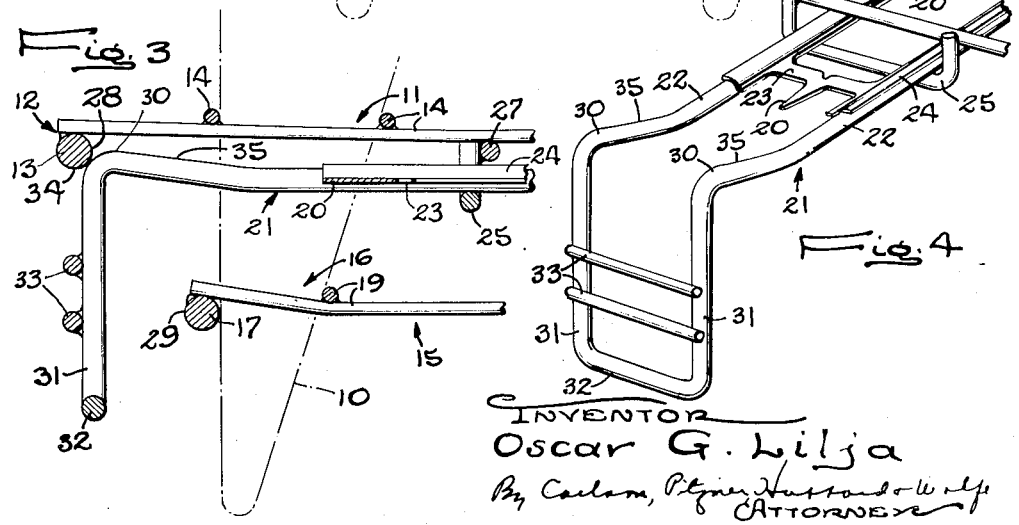
INVENTOR
Oscar G. Lilja

United States Patent Office 2,719,508
Patented Oct. 4, 1955

2,719,508

HOLDER FOR CONE-SHAPED CONFECTIONS

Oscar G. Lilja, Rockford, Ill., assignor to Drumstick, Inc., Fort Worth, Tex., a corporation of Texas Application March 14, 1950, Serial No. 149,522

3 Claims. (Cl. 118—31)

This invention relates generally to a holder for handling a plurality of cone-shaped confections during filling and dipping operations thereon. More particularly, the invention relates to a confection holder of the type having a frame with a plurality of confection-receiving recesses therein and a plurality of pins or prongs slidably mounted on the frame and adapted, when shifted in one direction along the frame, to impale the confections for holding the same in the recesses in all positions of the frame.

One object of the invention is to provide a novel construction of apparatus of the above character in which the impaling prongs may be removed quickly and easily from the frame when they are to be cleaned.

Another object is to support a plurality of prongs on a sliding member which is constructed and arranged on the frame to coact with parts on the latter in a novel manner for normally limiting back and forth movement of the member relative to the frame while permitting withdrawal of the member from the latter simply by a slight bending of one end portion of the member.

A more detailed object is to support the sliding member in a guideway arranged on the frame with one end thereof spaced inwardly from a stop on the frame a sufficient distance to permit the end of the member to be bent laterally of the plane of the guideway far enough to move past the stop.

Other objects and advantages of the invention will become apparent from the following detailed description taken in connection with the accompanying drawings, in which Figure 1 is a fragmentary plan view of a confection holder embodying the novel features of the present invention.

Fig. 2 is a fragmentary sectional view taken along the line 2—2 of Fig. 1.

Fig. 3 is a view similar to Fig. 2 showing the parts in a different position.

Fig. 4 is a fragmentary perspective view of the sliding member.

The confection holder shown in the drawings for purposes of illustration is especially adapted to support a plurality of hollow cone-shaped confections 10 during filling of the same with a confectionary material such as ice cream and during dipping of the larger ends of the cones in a suitable covering material such as a chocolate syrup. During the filling operation, the cones are supported with their larger ends disposed upwardly while, during the dipping operation, the holder and the cones are inverted so that the larger ends are disposed downwardly.

The larger ends of the cones 10 are received in spaced recesses 11 which are arranged on a frame 12 in one or more parallel rows and are adapted to support the cones with their axes substantially parallel. In this instance, the frame comprises a rectangular frame member 13 of wire having interconnected crossed wires 14 secured to the sides and the ends of the frame member and defining the recesses 11 between them.

A second frame 15 having cone-receiving recesses 16 therein registering with the recesses 11 in the first frame 12 is spaced from and secured to the latter to support each cone accurately in an upright position by engaging the cone at a point spaced along its axis from its point of engagement with the first frame. The second frame is similar in construction to the first frame and has a rectangular frame member 17 secured to the first frame member 13 by upright rods 18 spaced around and welded to the members. Welded to the sides and ends of the second frame member are cross wires 19 adjacent pairs of which are spaced closer together than the wires 14 of the first frame so that the second recesses 16 are slightly smaller than the first recesses 11. Herein, since the top of each cone is inclined slightly with respect to the axis thereof, the centers of the second recesses are offset slightly from the centers of the first recesses 11 (see Fig. 2) to dispose the tops of the cones in a plane substantially parallel to the frames.

To hold the cones 10 in the recesses 11 and 16 while the holder is inverted for the dipping operation, the cones in each row of recesses are impaled by prongs or pins 20 which are carried by an elongated slide 21 mounted in a guideway on the frame 12 for endwise movement back and forth along the row. Each slide is formed by spaced parallel side members 22 which straddle the row of recesses for the slide and have cross members 23 secured thereto at spaced points along the side members and each carrying one of the prongs. In this instance, the cross members and the prongs are integral with each other and form a part of a sheet metal stamping having connecting pieces 24 joining the cross members and welded to the side members, the latter being elongated pieces of heavy gauge wire.

The cones 10 are prevented from tipping when they are impaled by positioning the guideways between the frames 12 and 15 for engagement of the prongs 20 with the cones at points disposed between the points of support for the latter. In this instance, each guideway is defined by two U-shaped wire guides 25 and 26 depending from and welded adjacent their free ends to cross-bars 27 extending across the top frame member 13 and welded at opposite ends to the sides of the frame member.

Each slide 21 is movable endwise along its guideway back and forth between one limit position (see Fig. 2) in which the prongs 20 are withdrawn from the recesses in the row straddled by the slide to permit the cones to be inserted and withdrawn therefrom and another limit position (see Fig. 3) in which the prongs project at least partially across the recesses to impale the cones. Such back and forth movement of the slide is limited by stops 28 and 29, one of which is preferably formed on one end of the lower rectangular frame member 17, and the other one 28 of which is formed on the corresponding end of the upper frame member 13. Herein, the stop 28 on the top frame is spaced outwardly from the other stop 29 and engages the slide to limit movement of the latter outwardly along the guideway. The other or inner stop 29 on the lower frame engages the slide to limit the inward movement thereof.

To permit each slide 21 to be withdrawn from between the frames 12 and 15 and replaced therein quickly and easily, the invention contemplates forming a lateral projection 30 on the outer end portion of the slide and offsetting the outer stop 28 from the plane of the guideway to normally intercept the projection while permitting the major portion of the slide to move freely past the stop. Also, the outer guide 25 is spaced inwardly from the outer stop 28 a sufficient distance to enable the portion of the slide which overhangs the outer guide to be bowed about the latter far enough without taking a permanent set to move the projection laterally the distance of its offset and into the plane of the guideway so that the projection may clear and move past the outer stop.

In the present instance, the side members 22 of the slide are generally L-shaped having longer legs disposed in the guideway and shorter legs 31 depending from the longer legs adjacent the outer end thereof to engage the inner stop 29. The shorter legs at their free ends are formed integral with a connecting member 32 and intermediate their ends are welded to two cross rods 33. One projection 30 is formed on each side member 22 of each slide and is located at the heel of the L or, on the external portion of the longer leg adjacent the junction thereof with the shorter leg of the L. While the projections 30 may be formed in various ways, herein they constitute integral parts of the longer legs formed by bending those parts of the latter adjacent the shorter legs laterally of and away from the plane of the longer legs on the side thereof opposite the shorter legs. Each side member is thus formed by bending one end portion of a generally straight piece of wire first laterally in one direction and then reversely in the opposite direction. If desired, all of the slides may be moved back and forth simultaneously by a bar (not shown) extending across and welded to all of the shorter legs of the slides.

Cam means is provided for camming the outer end portion of each slide 21 laterally in the final inserting movement thereof so as to enable the projections 30 thereon to move past the outer stop 28. In the present instance, the cam is a surface 34 formed on the outer stop itself and engageable with inclined follower surfaces 35 on the projections. These inclined surfaces slope outwardly and along the side members 22 to merge at their outer ends with the outermost surfaces of the projections.

To remove one of the slides from its guideway, the connecting member 32 of the shorter legs 31 of the slide is grasped in one hand and pulled by the operator outwardly until the projections 30 engage the outer stop 28. Then, the connecting member is pressed by the operator downwardly away from the top frame 12 so that the longer legs are bowed slightly about the outer guide 25 and the projections are swung downwardly into the plane of the guideway to clear the outer stop. While the projections are thus held by the operator away from the stop, the connecting member is pulled outwardly to move the projections past the stop. When the projections are beyond the latter, the downward pressure on the connecting member is released while the member is still being pulled outwardly, the projections then springing back into the plane of the guideway with the longer legs free to slide along the guideway without interference from the stop.

To insert a slide into the guideway therefor, the longer legs are alined with the guideway and the shorter legs 31 are pushed inwardly to move the longer legs substantially the full length of the guideway without any interference from the outer stop. When the inclined surfaces 35 on the trailing ends of the longer legs engage the outer stop 28 near the end of the inserting movement, the longer legs are bowed automatically about the outer guide 25 and the projections 30 are moved thereby downwardly and away from the stop. Once beyond the latter the projections spring upwardly out of the plane of the guideway and into the plane of the stop so as to be engageable by the latter for again limiting the outward movement of the slide.

I claim as my invention:

1. A confection holder having, in combination, a frame, a guideway mounted on said frame, means on said frame defining recesses spaced apart in a row extending longitudinally of said guideway and each adapted to receive and support a cone-shaped confection with the axis of the latter extending transversely of the guideway, an elongated rectangular wire member having one end portion slidably disposed in said guideway and its other end portion bent along an incline and then at right angles across the member to form an L-shaped slide having an external projection at the heel of the L, spaced prongs projecting longitudinally of said guideway and carried by and movable with said first end portion of said slide between retracted positions out of said recesses to permit confections to be inserted and removed from the recesses and advanced positions in which the prongs are disposed in the recesses to impale confections, and a bar supported by said frame and disposed beyond one end of said guideway in the path of movement of said projection to engage the latter to limit movement of said slide out of the guideway, said other end portion of said slide overhanging said end of said guideway and being bendable transversely of the guideway to carry the projection out of alinement with said bar for movement of the projection past the latter and the slide out of the guideway and said bar coacting with said incline to cam the projection laterally and permit the same to pass by the bar as the slide is inserted in the guideway.

2. A confection holder having, in combination, a frame, a guideway mounted on said frame, means on said frame defining recesses spaced apart in a row extending longitudinally of said guideway and each adapted to receive and support a cone-shaped confection with the axis of the latter extending transversely of the guideway, an elongated slide including rigidly connected and laterally spaced side members extending substantially throughout the length of the slide and having corresponding first end portions slidably disposed in said guideway and other end portions overhanging one end of the guideway, a projection rigid with and extending outwardly from said slide on said overhanging end portions of said side members thereof, spaced prongs rigid with and extending longitudinally of said first end portions of said side members for movement therewith relative to said recesses and back and forth between retracted positions out of the recesses and advanced positions in which confections in the recesses are impaled by the prongs, and a stop rigid with said frame and disposed beyond said one end of said guideway in the path of movement of said projection to abut the latter and normally limit movement of said slide out of the guideway, said overhanging end portions of said side members being bendable transversely of said guideway to carry said projection out of alignment with said stop to permit movement of the projection past the stop for removal of the slide from the guideway.

3. A confection holder having, in combination, a frame, a guideway mounted on said frame, means on said frame defining recesses spaced apart in a row extending longitudinally of said guideway and each adapted to receive and support a cone-shaped confection with the axis of the latter extending transversely of the guideway, an elongated slide including a part extending throughout the length of the slide and having one end portion slidably disposed in said guideway and its other end portion extending beyond and overhanging one end of said guideway, a projection rigid with and extending outwardly from said overhanging end portion of said slide part, spaced prongs rigid with and extending longitudinally of said first end portion of said slide part for movement therewith relative to said recesses and back and forth between retracted positions out of the recesses and advanced positions in which the prongs impale confections in the recesses, and a stop rigid with said frame and disposed beyond said one end of said guideway in the path of movement of said projection to abut the latter and normally limit movement of said slide out of the guideway, said overhanging end portion of said part being bendable transversely of said guideway to carry said projection out of alinement with said stop to permit movement of the projection past the stop for removal of the slide from the guideway.

References Cited in the file of this patent

UNITED STATES PATENTS

| | | |
|---|---|---|
| 2,019,877 | Thomas | Nov. 5, 1935 |
| 2,282,661 | Lewis | May 12, 1942 |